United States Patent
Berges et al.

(10) Patent No.: US 6,805,378 B2
(45) Date of Patent: Oct. 19, 2004

(54) ROLLOVER PROTECTION SYSTEM FOR MOTOR VEHICLES

(75) Inventors: Stephan Berges, Gummersbach (DE); Jozsef Lang, Budapest (HU); Reinhard Nowack, Drolshagen (DE)

(73) Assignee: Ise Innomotive Systems Europe GmbH, Bergneustadt (DE)

( * ) Notice: Subject to any disclaimer, the term of this patent is extended or adjusted under 35 U.S.C. 154(b) by 100 days.

(21) Appl. No.: 10/270,908

(22) Filed: Oct. 15, 2002

(65) Prior Publication Data

US 2003/0075911 A1 Apr. 24, 2003

(30) Foreign Application Priority Data

Oct. 18, 2001 (DE) .......................................... 101 51 387

(51) Int. Cl.⁷ .............................................. B60R 21/13
(52) U.S. Cl. .................................. 280/756; 296/190.03
(58) Field of Search ............................... 280/756, 753; 296/190.03, 102, 107.03

(56) References Cited

U.S. PATENT DOCUMENTS 5,626,361 A * 5/1997 Heiner ........................ 280/756
5,971,434 A * 10/1999 Neufeld et al. ............. 280/756

FOREIGN PATENT DOCUMENTS

DE      43 42 400      2/1995
DE      100 40 649      9/2001

* cited by examiner

*Primary Examiner*—Peter C. English
(74) *Attorney, Agent, or Firm*—Hudak, Shunk & Farine Co. LPA

(57) ABSTRACT

Systems of this kind typically are equipped with a roll bar (1) mounted within a cassette-like housing (7) which can be firmly attached to the vehicle and has two U-shaped lateral parts (8, 9) which are linked to one another at the bottom by a bottom part (10) and at the top, by a guide block (11). In order to ensure small assembly dimensions while at the same time offering a low-cost connection method, the invention provides a connection of the guide block (11) to the U-shaped lateral parts (8, 9) in the shape of a form-fit connection (8a, 11a).

5 Claims, 2 Drawing Sheets

ROLLOVER PROTECTION SYSTEM FOR MOTOR VEHICLES

FIELD OF THE INVENTION

The invention relates to a rollover protection system with a roll bar mounted in a cassette-type housing which can be firmly attached to the vehicle and which has two U-shaped lateral parts linked to one another by a bottom part at the bottom, and by a guide block at the top.

BACKGROUND OF THE INVENTION

Rollover protection systems of this kind serve the protection of occupants of motor vehicles without protective roofs, typically of convertibles or sports cars.

In methods known to the art a fixed roll bar spanning the entire vehicle width is provided or a fixed roll bar without height adjustment is allocated to each vehicle seat.

In both solutions, the increased air resistance and the generation of driving noises are felt to be disadvantages, aside from the impairment of the vehicle appearance.

Therefore, the design solutions increasingly prevailing in the market provide a roll bar which is normally retracted and quickly extended into a protective position in the case of danger, i.e. when a rollover threatens, in order to prevent the occupants of the vehicle from being crushed by the overturning vehicle.

Typically, these solutions provide a rollover structure mounted in a guide structure firmly attached to the vehicle, wherein the rollover structure is U-shaped or formed from a profile structure, and wherein the guide structure is attached inside a cassette-type housing. This rollover structure is normally kept in a lower resting position by a holding device working against an actuating compression spring, and in the case of a rollover, can under sensor control be brought into an upper, protective position by the force of the spring while the holding mechanism is released and while an interlocking device preventing the roll bar from being pressed down is activated.

For this purpose, one cassette is allocated to each vehicle seat.

The holding device typically is equipped with a holding element which is attached to the rollover structure and connected to a tripping element of a sensor-controlled tripping system by a disengageable mechanical activation mechanism, wherein the tripping element is typically formed by a tripping magnet, the so-called crash magnet, or by a pyrotechnical tripping element.

The interlocking device typically comprises a pivoting articulated, spring-preloaded latch with toothed segments and a fixed tooth rail, a latch pin or similar device, wherein one interlocking element is connected to the roll bar, while the other is firmly connected to the vehicle.

A cassette design of this kind of a rollover protection system with a U-shaped roll bar is disclosed, for example, by the patent application DE 43 42 400 A I.

The known rollover system according to the patent application DE 43 42 400 A I has a housing in the form of a U-shaped cassette with one open side and with two lateral walls each of which is equipped on the open side of the cassette with a chamfered angled piece for firmly fastening the cassette to the vehicle, to each of which, in addition, a bottom plate is attached, and which, finally, are linked to one another in front via a cover wall. Furthermore, the rollover protection system is equipped with a U-shaped roll bar comprising a curved segment and two parallel leg pipes each of which has a closed circumferential surface and which are connected at their open end via a cross arm-like, stiffening fastening element.

Furthermore, the system is equipped with two standpipes each of which is with one end attached to the housing bottom, each of which in its interior contains one compression spring solely for actuating the roll bar, and each of which is enveloped coaxially by a leg pipe and also has a closed circumferential surface as well as a guide block attached flatly at the upper end of the housing to the lateral walls of the cassette and equipped with guide openings to allow additional external guidance of the leg pipes.

An improved version of a cassette system of this kind disclosed by the patent application DE 100 40 649 C1 is equipped with U-shaped lateral parts within which the guide block is attached with the aid of U-shaped extensions and the cross arm with the corresponding extensions is mounted.

According to prior art, the mechanical connection of the guide block to the U-shaped lateral parts is provided by means of eight riveted joints. Riveted joints typically cause protrusions enlarging the assembly dimensions of the cassette beyond the width of the U-shaped lateral parts. Since the assembly dimensions, as set by the vehicle manufacturer, are tending toward a decrease of the measurements, it became necessary to countersink the rivet holes in a manufacturing step preceding the riveting procedure so that the rivet head will not protrude. This procedure, however, is relatively costly.

SUMMARY OF THE INVENTION

The invention relates to the object of creating a mechanical connection of the guide block to the U-shaped lateral parts which can be produced with relatively simple means and without protrusions for the rollover protection system referenced above for motor vehicles with a roll bar mounted in a cassette-type housing which can be firmly attached to the vehicle and which is equipped with two U-shaped lateral parts which are, without lateral protrusion, linked to one another by a bottom part at the bottom, and by a guide block at the top.

This object is achieved according to the invention by the fact that the guide block and the U-shaped lateral parts are equipped with integrated fastening elements providing a form-fit connection in the form of a latch-type or clip-type connection.

A form-fit connection of this kind without lateral protrusion, which thus is directed into the interior of the cassette, is relatively easy to manufacture, in particular, by constructing and shaping the fastening elements already during manufacture of the U-shaped lateral parts and the guide block. The joining procedure advantageously does not require tools and, in particular, no riveting station. In addition, a very assembly-friendly form-fit connection results, since the guide block can simply be inserted into the U-shaped lateral parts and then automatically latches into the desired position.

A series of possibilities for the construction of a latch-type or clip-type connection of this kind are available to the expert. According to a refinement of the invention, an advantageous design provides an elastically yielding strap or pin, bent toward the interior of the cassette, to serve as fastening element on each of the two legs of the U-shaped lateral parts, and provides lateral grooves as the corresponding fastening elements at the ends of the guide block, mounted in the U-shaped lateral parts, in such a way that in the desired fastening position, the strap or pin latches into the respective groove.

A form-fit connection of this kind can advantageously be produced economically by relatively simple means by providing a strap or pin cut free and stamped from the material of the U-shaped lateral parts and/or by generating the groove by milling it out of the guide block.

BRIEF DESCRIPTION OF THE DRAWINGS

The invention is described in detail with reference to an embodiment represented in the drawings.

DETAILED DESCRIPTION OF THE INVENTION

Figure 1:
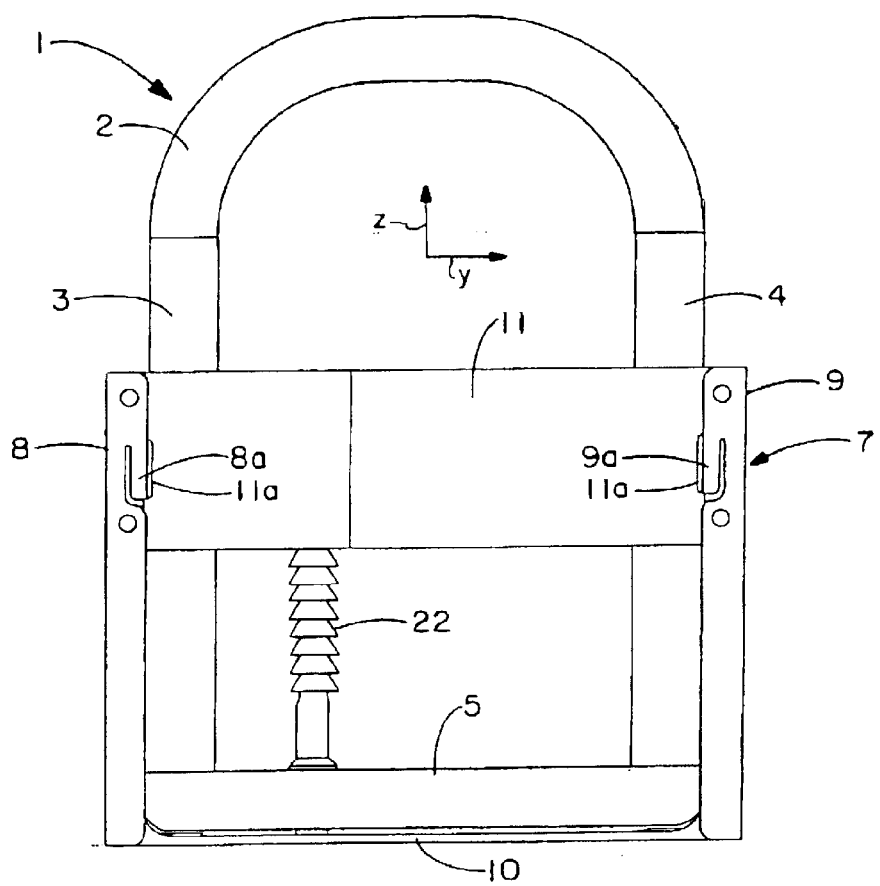
FIG. 1 shows a simplified view of the basic structure of a preferred roll bar system based on the cassette principle with a guide block and U-shaped lateral parts, wherein a form-fit connection is provided between guide block and lateral parts.

FIG. 1 shows a simplified view of the basic structure of a preferred rollover protection system based on the cassette principle, as disclosed, for example, by the patent application DE 100 40 649 C1. For the sake of better comprehension, the FIG. 1 of the said DE patent application has been included in the present document as FIG. 3.

To begin with, this rollover protection system is equipped with a U-shaped roll bar 1 which typically is composed of three pipes. In this system, the base leg of the roll bar 1 is formed essentially by a curved pipe 2 the ends of which are rigidly joined to two leg pipes 3, 4 by welding or by other suitable joining methods.

For reasons of stability, oval or cornered cross sections may also be chosen for the leg pipes of the roll bar, aside from cylindrical cross sections.

In principle, other forms of rollover structures can also be used, such as a rollover structure composed of a one-piece profile structure.

The open ends of the leg pipes 3, 4 are rigidly connected to one another by means of a cross arm 5. For this purpose, the cross arm 5 was designed as profile structure with specified height equipped with bores for the ends of the leg pipes 3, 4 in which these are fastened.

The roll bar 1 with its two leg pipes 3, 4, which have a closed circumferential surface, is mounted in a cassette-like housing 7 in such a way that it can be extended and retracted. This housing is equipped with two lateral parts 8, 9 formed by a U-shaped profile structure and preferably consisting of metal, in particular, of steel. These lateral profiles 8, 9 are linked to one another by a bottom plate 10 at the bottom, and by a guide block 11 on top.

Figure 3:
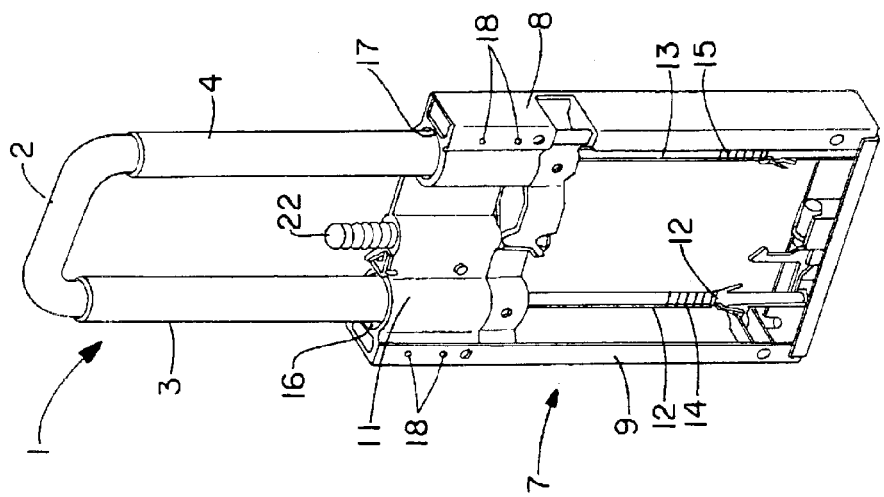
FIG. 3 shows a simplified view of a known roll bar cassette system wherein application of the invention is preferred.

As shown in FIG. 3 in detail, in the bottom plate 10, two spring guide bolts 12, 13 are anchored onto which preloaded actuating compression springs 14, 15 are pushed to serve the purpose of extending the roll bar 1 in the case of danger or if actuated manually, and which are directly enveloped by the leg pipes 3, 4.

For the sake of simplicity, this drive system is not shown in detail in FIG. 1.

Also not represented is the sensor-controlled holding and trigger system for holding the roll bar down in normal position as well as for quickly extending it in the case of danger or during testing.

With regard to the interlock system for preventing the extended roll bar from being pushed in, only the known latch pin 22 of FIG. 3 is represented in FIG. 1.

The guide block 11 is equipped with two guide bores 16, 17 which laterally support the circumferential surface of the leg pipes 3, 4 and provide guidance within large tolerances for the leg pipes 3, 4 which move along the guide bores. Furthermore, it is at both lateral ends equipped with U-shaped extensions 11b, 11c (FIG. 4) with which it is inserted between the legs of the U-shaped lateral parts 8, 9 and mechanically connected to the same at the time of assembly. This mechanical connection is currently provided by a riveted joint, and the rivet heads, now identified as 18, can be seen in FIG. 3. Eight riveted joints are required for each rollover system.

Figure 4:
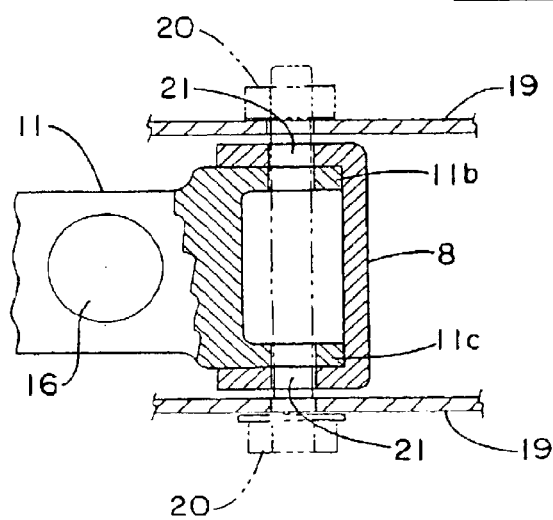
FIG. 4 shows a schematic view of the cross section of the known installation of a roll bar cassette system in a housing firmly attached to the vehicle.

The cassette completed in this manner is firmly installed in the vehicle by the automobile manufacturer. This occurs in different ways, depending on the type of vehicle concerned. One advantageous, and also assembly-friendly method consists of anchoring a shaft-shaped housing 19 (FIG. 4) within the vehicle, be it on the floor, on a vehicle, wall, or on a seat, and of inserting the cassette housing 7 into the housing 19 and fastening it within the housing with the aid of fasteners 20. For this purpose, two bores 21 are provided on the two ends of the guide block 11 or the U-shaped lateral parts 8, 9 for the respective fasteners 20 (FIG. 4).

The maximum assembly dimensions of the housing 19 are specified by the vehicle manufacturer. Due to the fact that the space available in the interior of the vehicle is quite limited, the assembly dimensions tend toward small values. This however causes problems for the insertion of the cassette housing 7 into the housing 19 because of the protrusions typically associated with riveted joints. This leads to the necessity of using a costly countersunk riveted joint, so-called blind rivets. Aside from the riveting procedure therefore, an additional, preceding manufacturing step of countersinking the rivet holes into the U-shaped lateral parts is required.

This costly riveted joint is replaced according to the invention by a form-fit connection as shown in FIG. 2. This actually represents a tool-free assembly aid for joining the guide block 11 and the U-shaped lateral parts 8, 9, since this joint does not have to withstand large forces, but so-to-speak only has to "hold together" the cassette until it is mounted in the shaft which in turn is firmly attached to the vehicle.

Figure 2B:
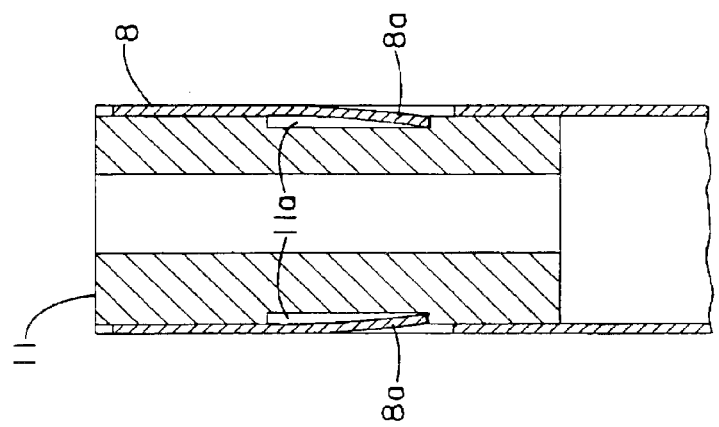
FIG. 2B shows a cross section along line 2B of FIG. 2A.
Figure 2A:
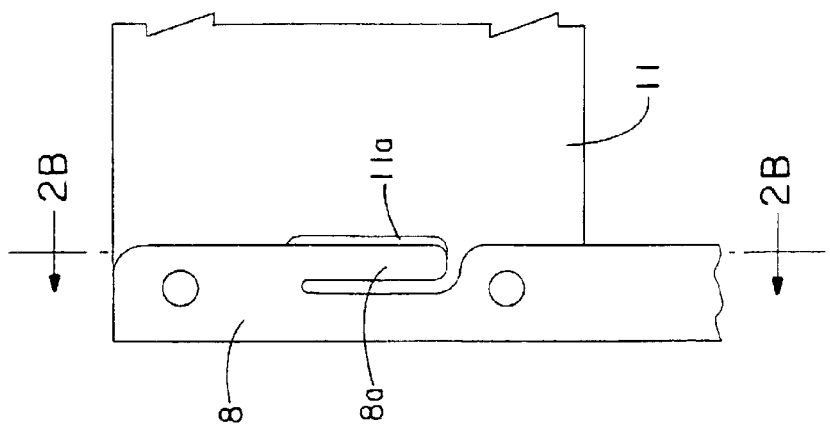
FIG. 2A shows an enlarged view of a segment of FIG. 1 with a detailed representation of the form-fit connection with snap-in pins on the lateral parts and snap-in notches on the guide block.

As visible in FIGS. 2A and 2B, two resilient straps or tongues 8a, 9a acting as interlock pins are disposed within the legs of the U-shaped lateral parts—here of the lateral part 8. These straps or tongues 8a, 9a are preferably constructed already during the production of the U-shaped lateral parts 8, 9 which typically occurs by starting with a rectangular plate and bending it off at a right angle along the longitudinal sides while forming the legs of the lateral guide system namely, the U-shaped lateral parts 8, 9. Before this bending process, the latches are cut free and stamped in the plate segments which form the future legs, in such a way that they are bent slightly inward forming the resilient straps or tongues 8a, 9a.

As counterpart for the resilient straps or tongues 8a, 9a, grooves 11a are milled out of the guide block 11. The guide block 11 then is inserted into the frame of the cassette at the time of assembly.

The resilient straps 8*a*, 9*a* on the lateral guides of the U-shaped lateral parts 8, 9 of the cassette housing 7, which can also be considered a frame allow free movement until the interlock position according to FIGS. 2A and 2B has been reached. In this interlock position, the straps 8*a*, 9*a* latch into the grooves 11*a* milled out of the guide block 11, which causes a form fit to be achieved between these two components. This form fit prevents the straps 8*a*, 9*a* and therefore the frame, from moving spring-like in the Y direction, where the directions y and z are shown in FIG. 1 and holds the guide block in position in the cassette housing 7 against the forces of the crash springs 14, 15. This represents a sufficiently secure connection of the guide block for the time of transport until the cassette housing 7 is mounted in the vehicle. The entire system, however, is only ready to absorb forces in association with the corresponding fastening elements in the vehicle, i.e. those of the cassette housing 7 in the housing 19 on the vehicle.

The above described form-fit latch connection which is a preferred embodiment of additionally possible form-fit types of fastening, in particular of latch or clip connections, has a series of advantages in comparison to the riveted joints used until now.

This is a tool-free joining technique;

Devices such as riveting stations are no longer needed;

An option for utilizing space is offered in simple manner;

The width of the cassette=the width of the frame without having to countersink rivets;

Material and therefore cost savings

The necessary latches can be stamped from the selected material during manufacture of the lateral guide.

By milling the grooves in the guide block, practically no additional cost is incurred, since the generation of the grooves on the guide block replaces the procedure of drilling the rivet holes in the known riveting process.

What is claimed is:

1. A rollover protection system for motor vehicle comprising: a roll bar mounted in a cassette housing which is adapted to be attached to the motor vehicle and which is equipped with two U-shaped lateral parts linked to one another by a cassette housing bottom part at a lower end and by a guide block at an upper end of the cassette housing without lateral protrusions, wherein the guide block and the U-shaped lateral parts have integrated fastening elements for a form-fit connection in the form of a latch connection.

2. A rollover protection system according to claim 1, wherein an elastically resilient strap or tongue which is bent toward an interior of the cassette housing is constructed on each of two legs of the U-shaped lateral parts to serve as fastening elements, and wherein grooves are constructed as corresponding fastening elements laterally at ends of the guide block which are disposed within the U-shaped lateral parts, in such a way that in a fastening position, each strap or tongue latches into the respective groove.

3. A rollover protection system according to claim 2, wherein the strap or tongue has a free end which is stamped from the material of the legs of the U-shaped lateral parts.

4. A rollover protection system according to claim 3, wherein each groove is provided by milling it out of the guide block.

5. A rollover protection system according to claim 2, wherein each groove is provided by milling it out of the guide block.

\* \* \* \* \*